(12) United States Patent
Maiquez Ferrer et al.

(10) Patent No.: US 10,624,332 B2
(45) Date of Patent: Apr. 21, 2020

(54) PROTECTIVE SCREEN AGAINST AGGRESSIVE ANIMALS

(71) Applicants: Gerard Maiquez Ferrer, Barcelona (ES); Antonio Sánchez Gallardo, Barcelona (ES)

(72) Inventors: Gerard Maiquez Ferrer, Barcelona (ES); Antonio Sánchez Gallardo, Barcelona (ES)

(*) Notice: Subject to any disclaimer, the term of this patent is extended or adjusted under 35 U.S.C. 154(b) by 287 days.

(21) Appl. No.: 15/567,389

(22) PCT Filed: Apr. 22, 2016

(86) PCT No.: PCT/ES2016/070293
§ 371 (c)(1),
(2) Date: Oct. 18, 2017

(87) PCT Pub. No.: WO2016/170219
PCT Pub. Date: Oct. 27, 2016

(65) Prior Publication Data
US 2018/0132476 A1    May 17, 2018

(30) Foreign Application Priority Data
Apr. 23, 2015 (ES) ................. 201500302 U

(51) Int. Cl.
*A01M 29/30* (2011.01)
*B63C 9/05* (2006.01)
(Continued)

(52) U.S. Cl.
CPC .............. *A01M 29/30* (2013.01); *A01G 13/10* (2013.01); *A01M 29/08* (2013.01); *B63C 9/05* (2013.01); *E04H 17/14* (2013.01)

(58) Field of Classification Search
CPC .......... A01M 29/00; A01M 29/30; B63C 9/05; B63C 9/06; E04H 17/16; E04H 17/165; E04H 17/18; A01K 15/006; A01K 15/04
(Continued)

(56) References Cited

U.S. PATENT DOCUMENTS 138,763 A * 5/1873 Rose ..................... F41H 11/08
                                                          256/2
3,423,072 A * 1/1969 Bernstein ............... E04H 17/18
                                                          256/24
(Continued)

FOREIGN PATENT DOCUMENTS

DE      31412355 A1   10/1985
GB      2303646 A     2/1997
WO      00/78137 A1   12/2000

OTHER PUBLICATIONS

International Search Report dated Jul. 7, 2016 of corresponding International Application No. PCT/ES2016/070293 (3 pages).
(Continued)

*Primary Examiner* — Jonathan P Masinick
(74) *Attorney, Agent, or Firm* — Maier & Maier, PLLC

(57) ABSTRACT

A protective screen against aggressive animals, including a structure formed by frames provided with pointed elements which are installed for the purpose of creating secure zones that are protected against possible attacks from dangerous animals. A series of elemental modules having a square or rectangular tubular frame in polyethylene or hard plastic having four lances directed towards the centre but forming an angle "α" with the plane defined by the frame. Each lance has a shaft of the same material as the frame and a steel metal lance point that is protected against corrosion.

6 Claims, 3 Drawing Sheets

(51) Int. Cl.
*E04H 17/14* (2006.01)
*A01G 13/10* (2006.01)
*A01M 29/08* (2011.01)

(58) Field of Classification Search
USPC .................................................. 256/2, 3, 4
See application file for complete search history.

(56) References Cited

U.S. PATENT DOCUMENTS

| | | | | |
|---|---|---|---|---|
| 6,827,042 | B1 * | 12/2004 | Riddle | A01K 15/04 |
| | | | | 119/712 |
| 6,893,308 | B1 * | 5/2005 | Hayles | A62B 1/02 |
| | | | | 441/83 |
| 7,308,868 | B1 * | 12/2007 | Borg | A01M 29/30 |
| | | | | 119/452 |
| 7,866,635 | B2 * | 1/2011 | Payne | E04H 17/161 |
| | | | | 256/24 |
| 8,046,965 | B2 * | 11/2011 | Rieber | E04H 17/16 |
| | | | | 52/210 |
| 2004/0188667 | A1 * | 9/2004 | Ray | 256/67 |
| 2007/0138454 | A1 * | 6/2007 | Yeo | E04H 17/04 |
| | | | | 256/2 |
| 2014/0234573 | A1 | 8/2014 | Lindgren | |

OTHER PUBLICATIONS

PCT Written Opinion dated Jul. 6, 2016 of corresponding International Application No. PCT/ES2016/070293 (5 pages).

* cited by examiner

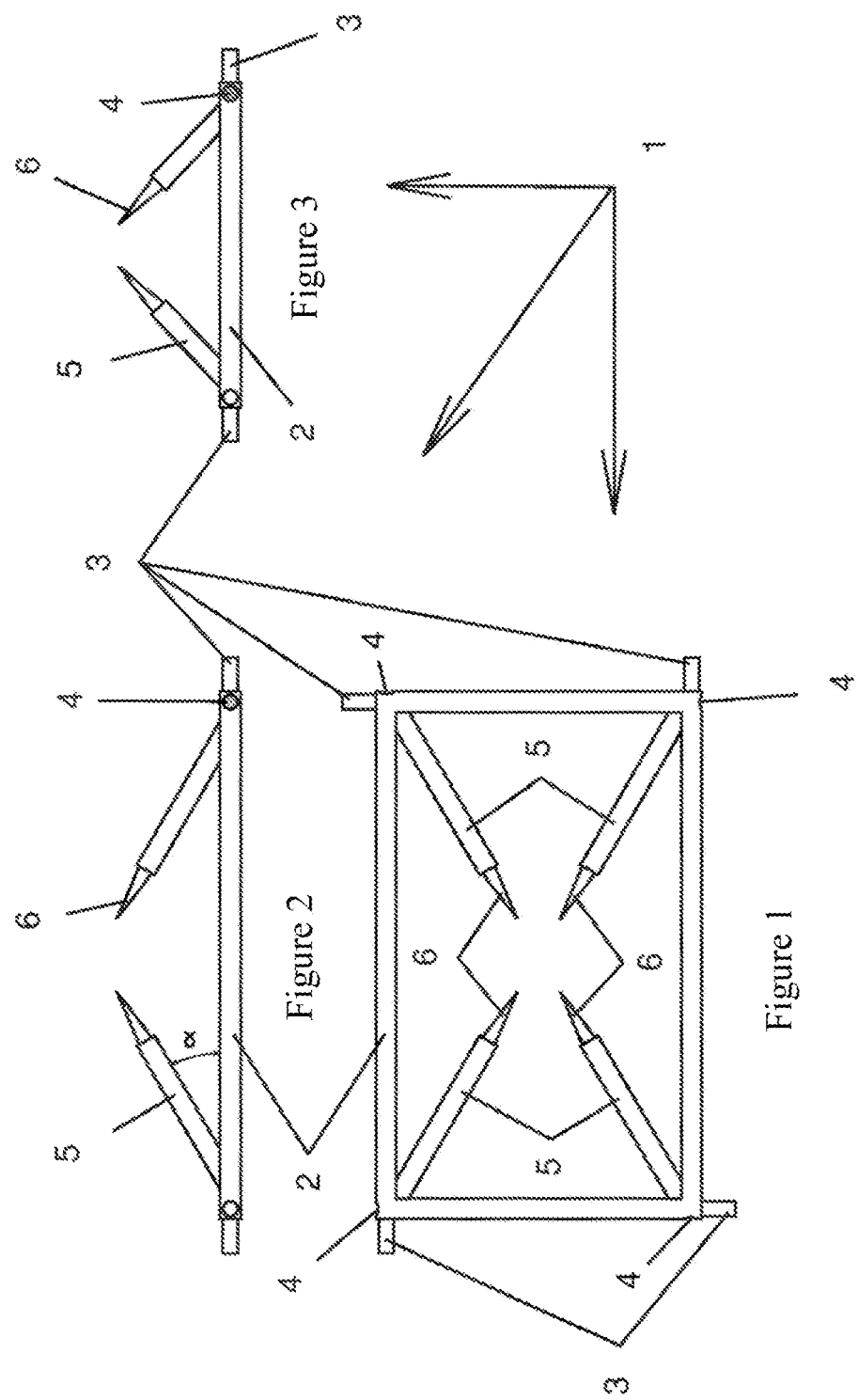

PROTECTIVE SCREEN AGAINST AGGRESSIVE ANIMALS

TECHNICAL FIELD OF THE INVENTION

The subject matter of the present invention pertains to a modular kit, in the form of a vertical screen, based on interconnected frames having elements which deter, as a first instance, and prevent the passage through them of aggressive animals of any type. Applicable to land facilities and especially for the marine environment against sharks and other predators which may cause damage to persons carrying on recreational activities, research studies, industrial developments or any other reason.

For land facilities, the screen is maintained in a substantially vertical position thanks to posts driven into the ground and in marine facilities one employs floats or buoys in the upper portion and a chain of weights or ballast in the lower portion in contact with the bottom.

The present invention involves the Fixed Construction Sector, as regards the Chapter on Land or Submarine Facilities, in the fabrication of interconnectible modules for the formation of land or marine enclosures.

BACKGROUND OF THE INVENTION

In the land environment, there are many known types of enclosures for bounding off certain areas in order to prevent the entry or exit of persons or animals. In zoological gardens or outdoor theme parks, the most customary enclosures are made of concrete walls, ditches, metallic netting or lattices which protect people against possible aggressions by the wild animals, bounding off the zones in which persons and animals may walk.

Simple solutions are also known of normal or barbed wire fences connected to a source of electricity to produce slight discharges when an animal comes into contact with them, even though these solutions are more suited to herds of cattle, sheep or horses.

In order to protect certain activities which are carried out under water, solutions are known which are based on fixed structures which totally enclose a space surrounded by open water. These are facilities of raft or swimming pool type, which contain sea water and form totally enclosed spaces denying access to predatory animals which could seriously endanger the activities of breeding, scientific research, or any other similar ones. There are also known registers connected to nets of every type, even though they are solutions which are heavily criticized by the animal protection societies because many animals die imprisoned in them.

SUMMARY OF THE INVENTION

In times of war, facilities have been used which prevented the passage of submarines which would become caught in very complex meshes or metallic nets.

The invention described in this document corresponds to an idea having no precedent, to the knowledge of the inventors, and embodied in a device which is very definite and efficient in preventing passage, yet prioritizes most particularly the aspect of deterrence, such that the animals prefer not to approach it.

The present invention pertains to a protective screen which, properly installed on terra firma or in the sea, makes it possible to design an area of protection for the safe performance of any given activity.

Basically, it involves an association of a multitude of square or rectangular modules which are fabricated so as to allow the inserting of one in another in successive manner, lengthwise or heightwise, producing a screen which, having certain pointed elements, proves to be effective in itself and a deterrent to any animal which attempts to cross it.

Each module is outfitted with lances or spikes located at the corners of the square or rectangle, directed toward its geometrical center but making an angle with the principal plane defined by said square or rectangle which orients the pointed elements toward the zone where the dangerous animals may approach it.

That is, the grouping of the four spikes forms a kind of truncated pyramid structure whose base is the perimeter of the module of the invention. Even though openings remain through which an animal may pass, depending on its size, the size of the module is designed in any case such that the protection is effective. If an animal approaches, the first effect will be a prodding, more or less intense according to the speed, so that it will be warned not to attempt this again. The inventors also take into account the effect of color in that they incorporate a painting of the modules in the colors which are the most deterrent to the animal world, namely black, red, and yellow.

The following sections include schematic drawings of the invention and a detailed description of the embodiments preferred by the inventors.

BRIEF DESCRIPTION OF THE DRAWINGS

Four figures have been included for a better understanding of the invention. All of these are schematic and should be understood as being illustrations of the invention, without exhausting it or excluding other possibilities in regard to the notion set forth.

FIGS. 1, 2 and 3

Figures 4, 5:
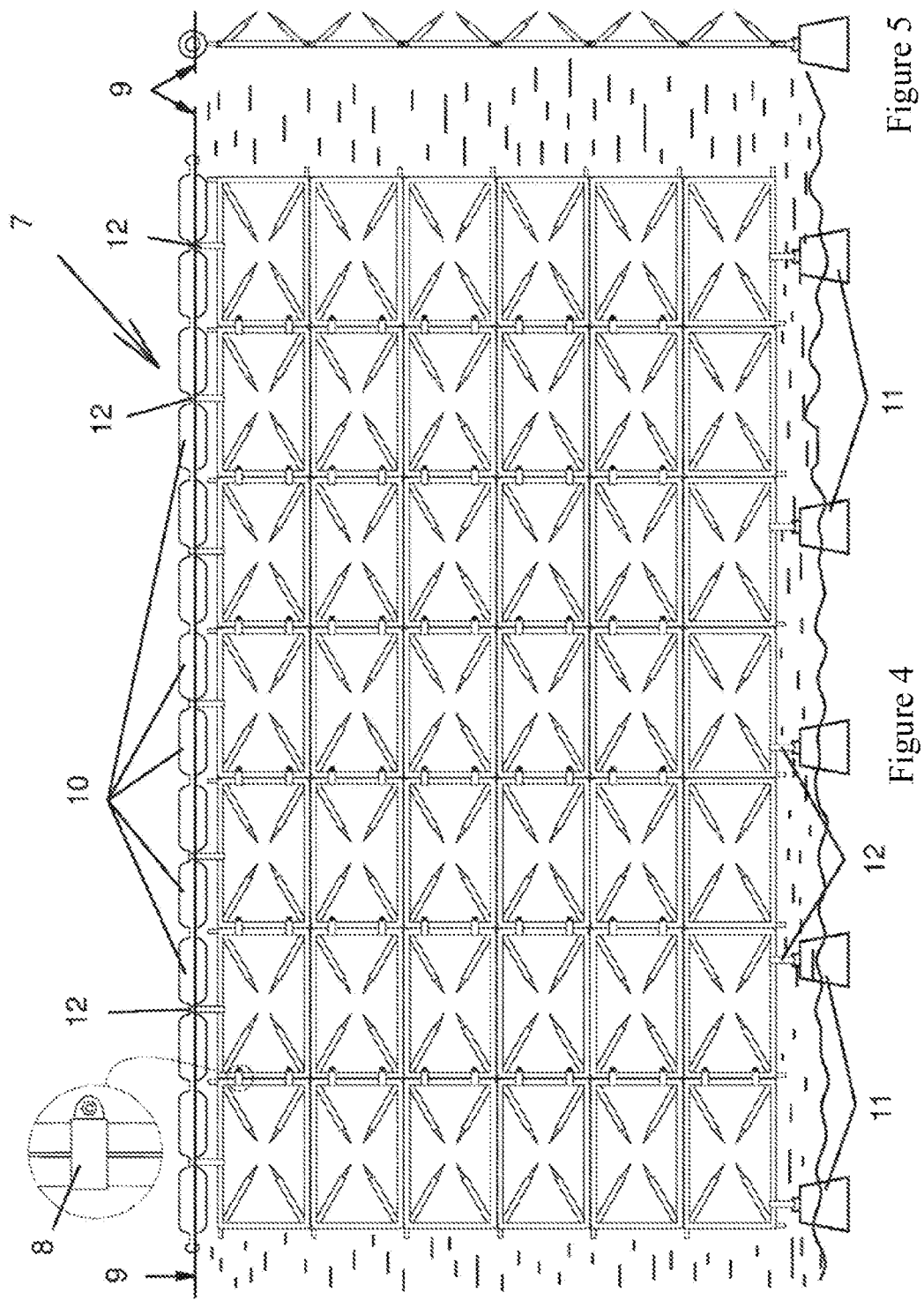

These figures represent three orthogonal plan view (FIG. 1), elevation view (FIG. 2), and profile view (FIG. 3) of the elemental module of the screen of the invention. The following elements are indicated:

1 Elemental module
2 Frame
3 Appendage
4 Orifice
5 Shaft
6 Lance tip

FIG. 4

Represents, in front view, the association of a series of elemental modules to form the protection screen. The screen, in this case, is applied to a submarine protection against sharks. The following are indicated:

7 Protection screen
8 Flange
9 Sea level
10 Float
11 Ballast
12 Belt

FIG. 5

This represents a profile view of the protection screen

FIG. 6

Represents a solution for enclosures on terra firma. The following is indicated:

13 Foundation
14 Post

DETAILED DESCRIPTION OF THE DRAWINGS

Protection screen against aggressive animals (7) (FIGS. 1 to 6) consisting of a structure formed by a plurality of frames provided with pointed elements which is installed for the purpose of creating secure zones that are protected against the danger of aggressive animals of any species, which in a preferred embodiment of the inventors consists of a series of elemental modules (1) composed of a tubular frame (2), of square or rectangular shape, from whose corners emerge four lances directed toward the geometrical center but making an angle α with the plane defined by the frame (2). Each lance is composed of a shaft (5) of the same material as the frame and a lance tip (6) made of marine stainless steel.

Each frame (2) has four appendages (3) and four orifices (4) situated at the positions indicated in FIGS. 1, 2 and 3. Both the appendages (3) and the orifices (4) have a circular cross section and their dimensions are such that each appendage (3) can be inserted with slight play in any given orifice (4) of another adjacent frame (2).

Under these conditions, it is possible to fit together one elemental module (1) on top of another identical adjacent one, whether in the vertical or the horizontal direction, making it possible to form a protection screen (7) of any given dimension.

The elemental modules of the invention make it possible to form protection screens either on terra firma or in the aquatic environment.

As an example, FIGS. 4 and 5 are included, representing a practical application in the aquatic submarine environment to form a screen (7) intended to protect zones of beaches, industrial exploitation, research activities, or any other similar ones in which it is desirable that the swimmers or persons working in the given zones may do so in total peace and safety as regards aggressive or dangerous animals.

The screen (7) has been formed by the juxtapositioning of a series of elemental modules (1) with their appendages (3) inserted into the corresponding orifices (4), ensuring that they are immovable with respect to each other by means of flanges (8). FIG. 4 details an enlargement of a flange (8) with its fastening screw.

The line of elemental modules (1) which should be situated near sea level (9) is joined to a series of floats (10) and the line of elemental modules (1) which should be situated at the sea bottom is joined to a series of ballasts (11) which ensure that the whole is immovable. The floats (10) and ballasts (11) are joined to the frames (2) by means of belts (12) or similar fasteners.

In FIG. 5, corresponding to the profile view of the screen (7), it is seen that the lances with their respective shafts (5) and lance tips (6) point to the right, which is where the open sea and consequently the dangerous animals are assumed to be. The left zone would then be the protected zone.

Figure 6:
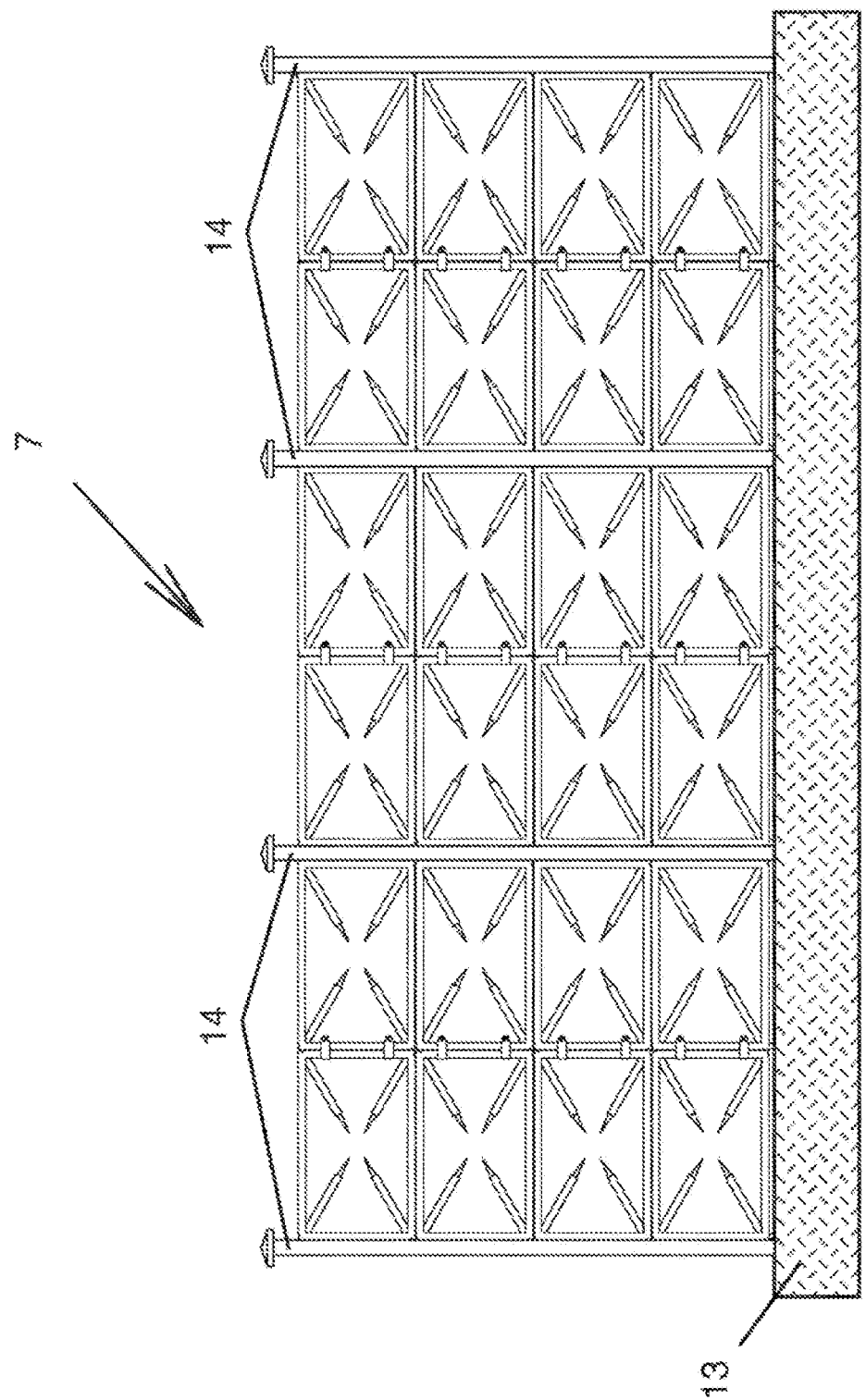

FIG. 6 includes a practical application corresponding to an enclosure on terra firma, where it is seen that the elemental modules (1) are seated directly on a linear foundation of concrete, air bricks, or any similar material.

The modular structure is extended lengthwise by adding two, three or more elemental modules (1) which are secured by posts (14). The number of modules in the vertical direction will depend on the type of animals representing the danger in the given instance.

As an interesting supplement, for purposes of deterrence, the inventors imagine the use of painted stripes in the colors which are the most significant in regard to animals, such as black, red, and yellow.

It is not considered necessary to expand the content of this description for a person skilled in the art to be able to understand the scope and the advantages deriving from the invention, as well as to develop and carry out its subject matter. Even so, it should be understood that the invention has been described in a preferred embodiment, so that it may be susceptible of modifications without this affecting or assuming any change in the foundation of this invention. That is, the terms in which this preferred description of the invention has been expressed should always be taken in the broad and not limited sense.

The invention claimed is:

1. A protection screen against aggressive animals for the purpose of creating secure zones that are protected against possible attack by dangerous animals, comprising a series of elemental modules; each module comprising a tubular frame of polyethylene or hard plastic, of square or rectangular shape, four lances directed toward a center point of the tubular frame; the four lances making an angle α with a plane defined by the frame, wherein each lance has a shaft of the same material as the frame and a lance tip made of stainless steel.

2. The protection screen against aggressive animals as in claim 1, further comprising a plurality of appendages and orifices, wherein the appendages and the orifices have a circular cross section, and dimensions are such that any appendage is insertable with a slight play in any orifice of another adjacent frame, wherein the appendages and orifices are deposed on a plurality of corners of the frame and a plurality of contiguous sides of a perimeter of the frame.

3. The protection screen against aggressive animals as in claim 1, wherein once each elemental module is connected to another identical adjacent one, both in the vertical and in the horizontal direction, they are secured by means of flanges screwed together.

4. The protection screen against aggressive animals as in claim 1, further comprising a series of floats established in an upper part of the frame and a series of ballasts at a bottom part of the frame, both being tied to the elemental modules by means of belts.

5. The protection screen against aggressive animals as in claim 1, wherein the screen is seated directly on foundations of concrete, or air bricks.

6. The protection screen against aggressive animals as in claim 1, wherein the modules are painted with black, red and yellow stripes.

* * * * *